Patented Feb. 5, 1935

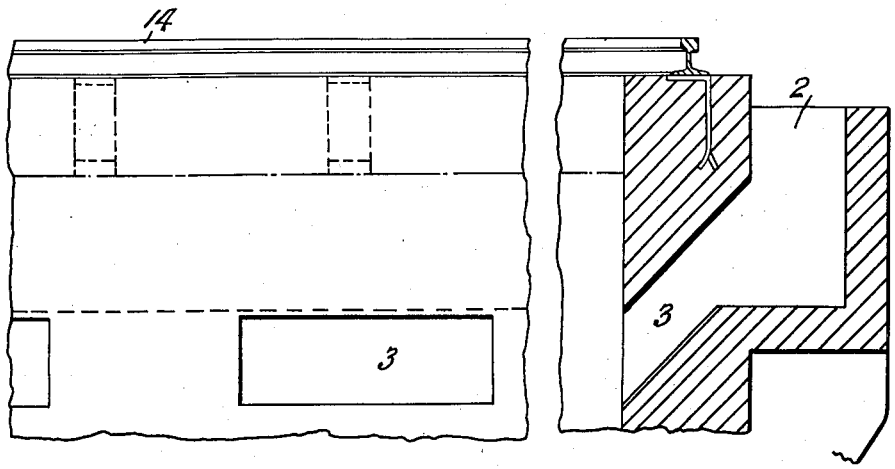
Fig. 4.
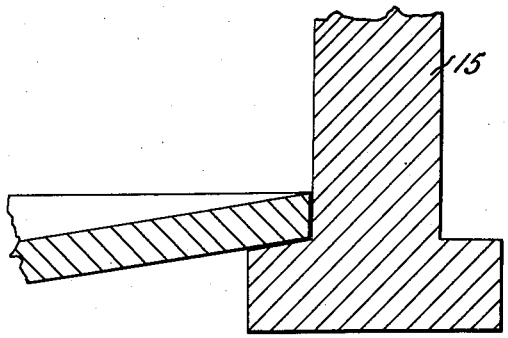
Fig. 6
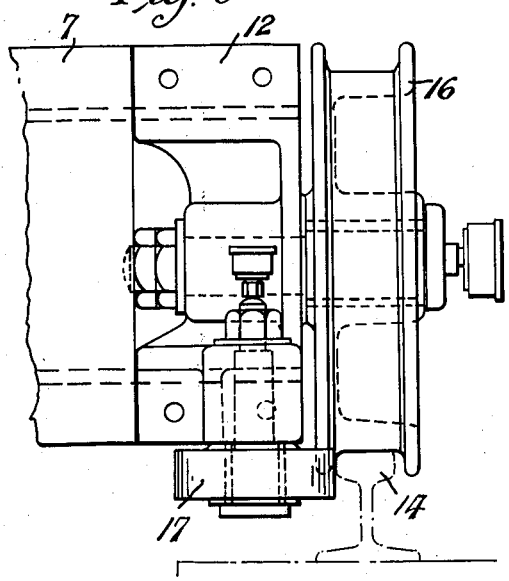

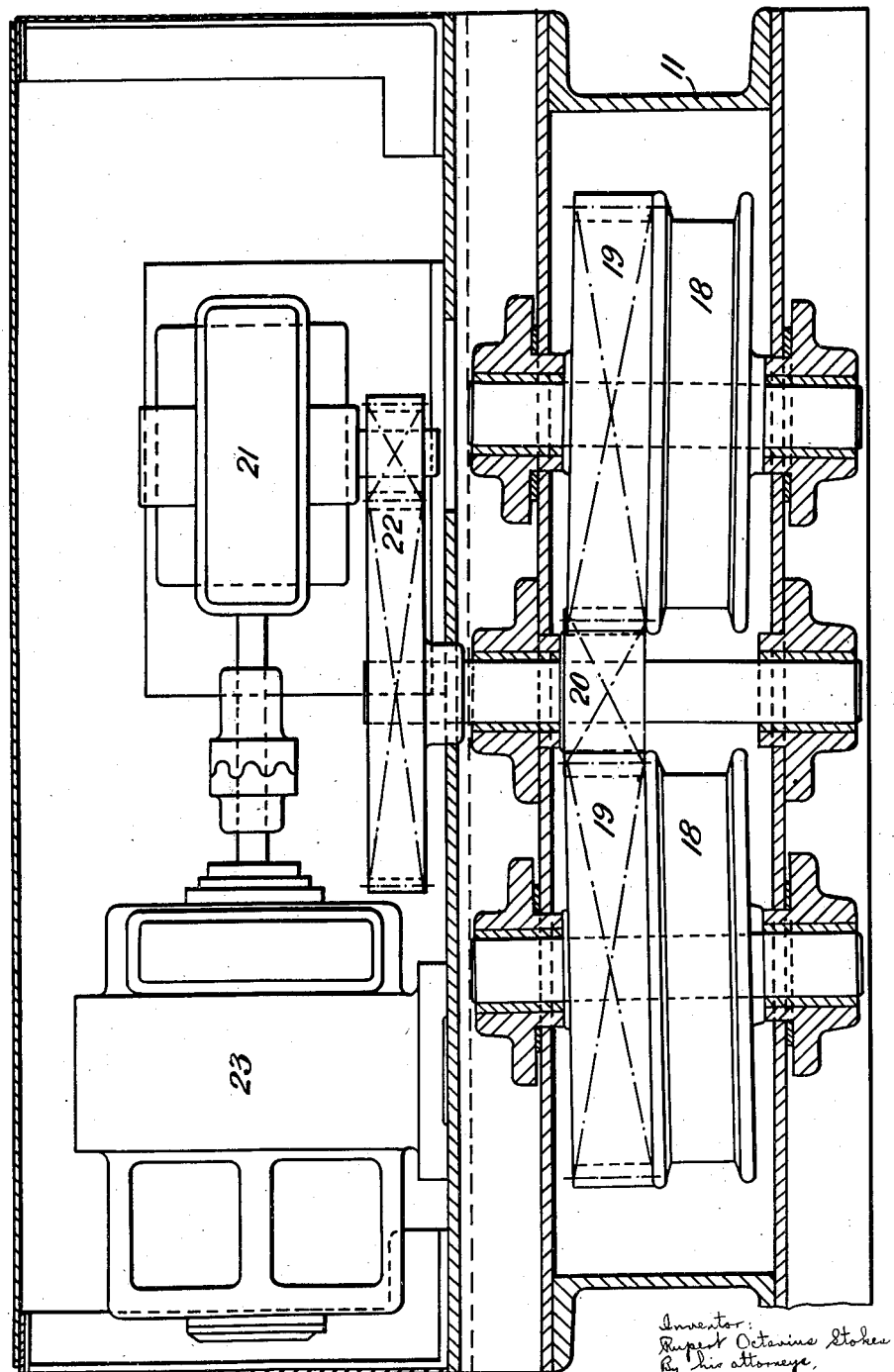

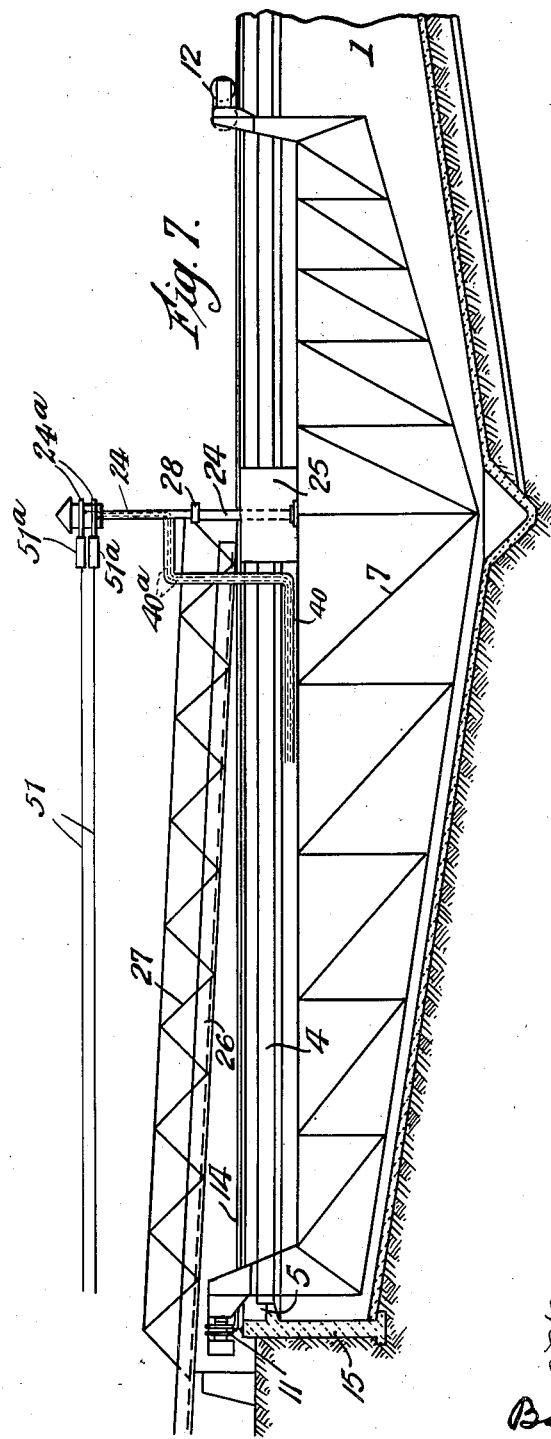

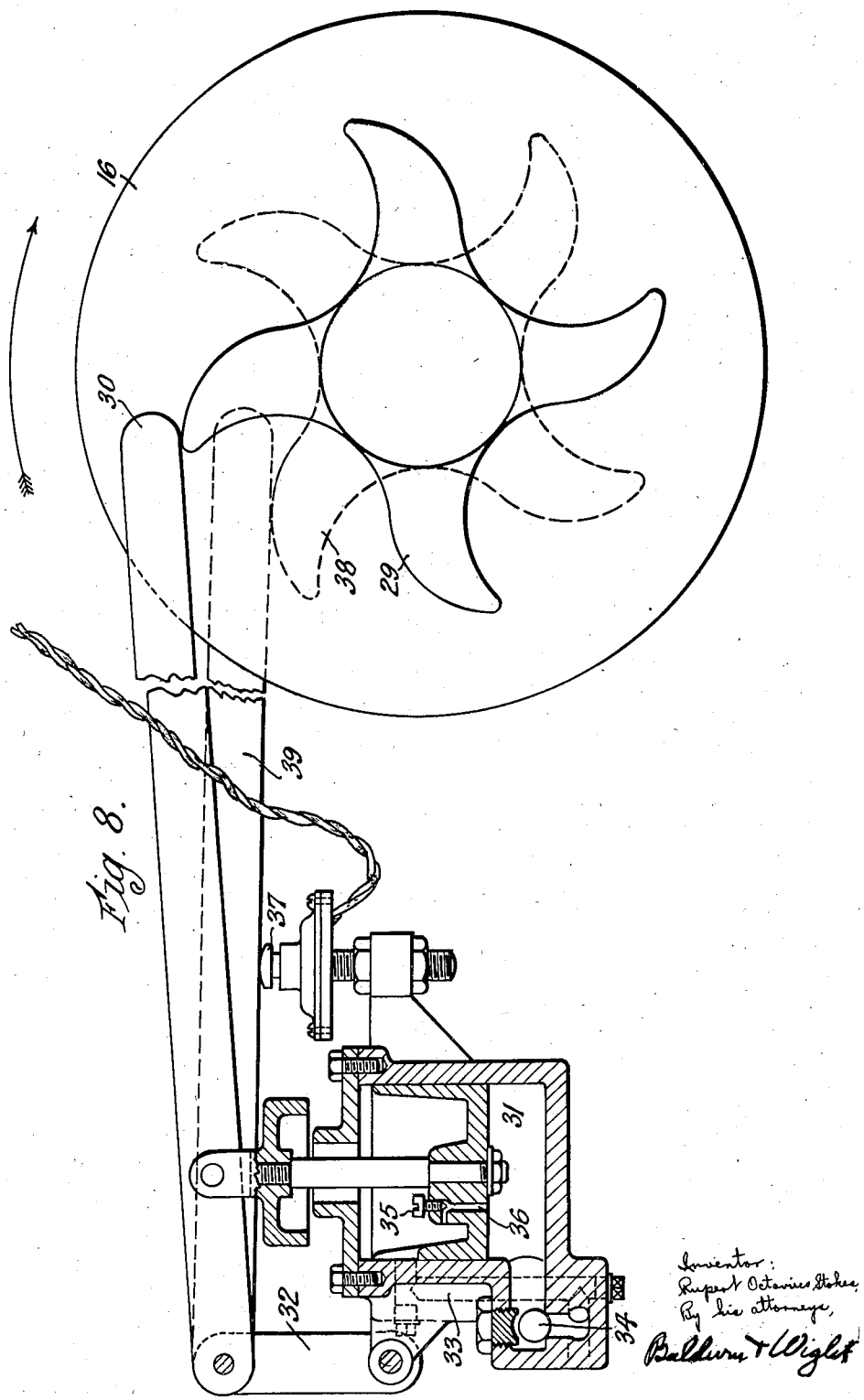

1,990,011

UNITED STATES PATENT OFFICE 1,990,011

STIRRING OR SCRAPING APPARATUS FOR USE IN TANKS FOR CLARIFYING LIQUIDS AND FOR OTHER PURPOSES

Rupert Octavius Stokes, London, England

Application September 18, 1933, Serial No. 689,975
In Great Britain September 7, 1932

3 Claims. (Cl. 210—55)

The invention relates to thickeners and other apparatus of a similar nature in which a stirring or scraping arrangement is caused to revolve in a tank containing the suspension or mixture to be treated. Such apparatus may find application to the concentration of ores, for example, by abstracting some of the water of suspension and to the clarifying of liquids by removing material in suspension.

According to the present invention the stirring or scraping arrangement is supported by means of trucks or carriages running on a track round the edge of the tank and the drive is obtained by coupling one or more motors to one or more of the truck wheels, the electric supply to the motors being taken through slip rings mounted centrally in relation to the tank.

The accompanying drawings show how the invention may be put into practice.

Figure 1:
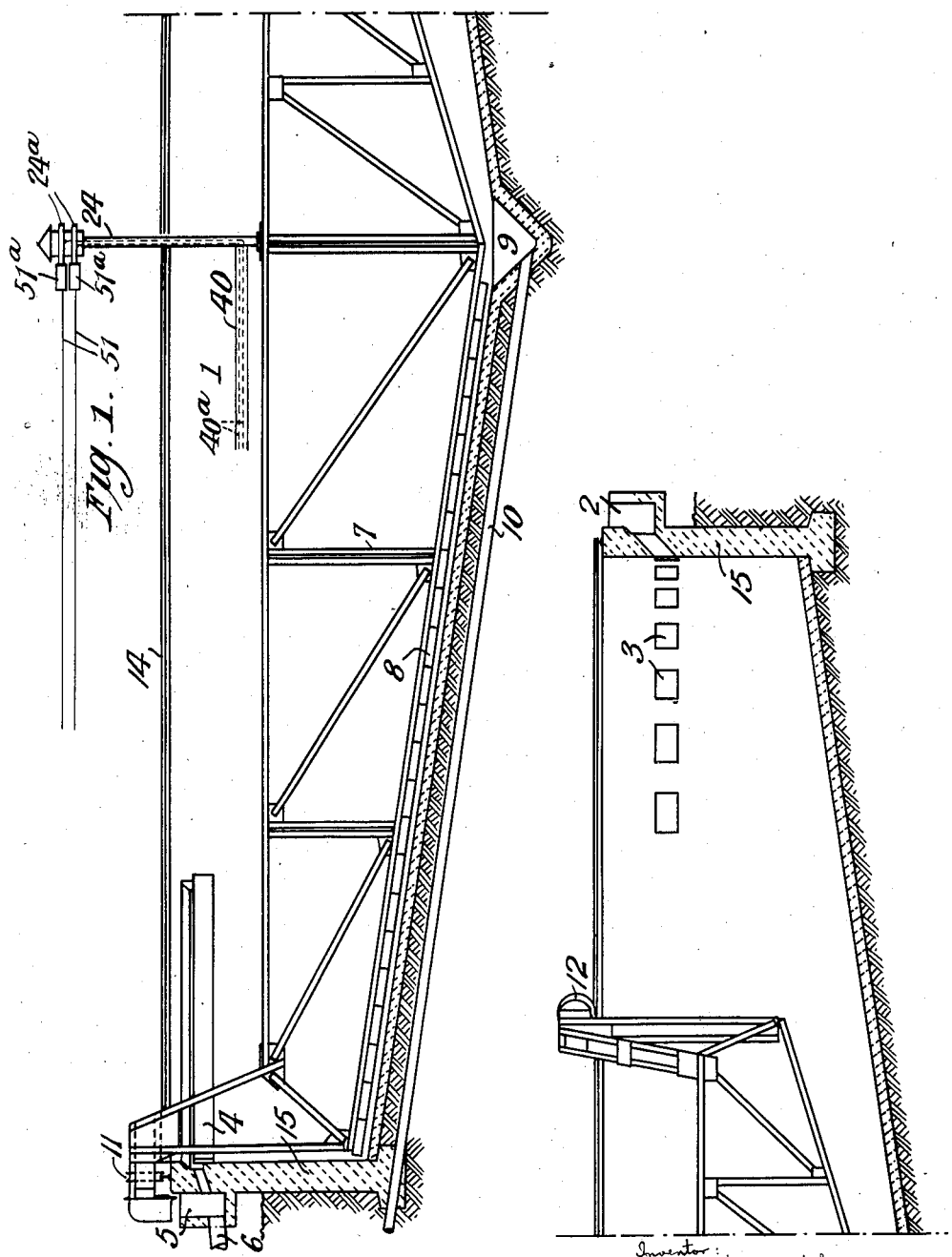
Figure 2:
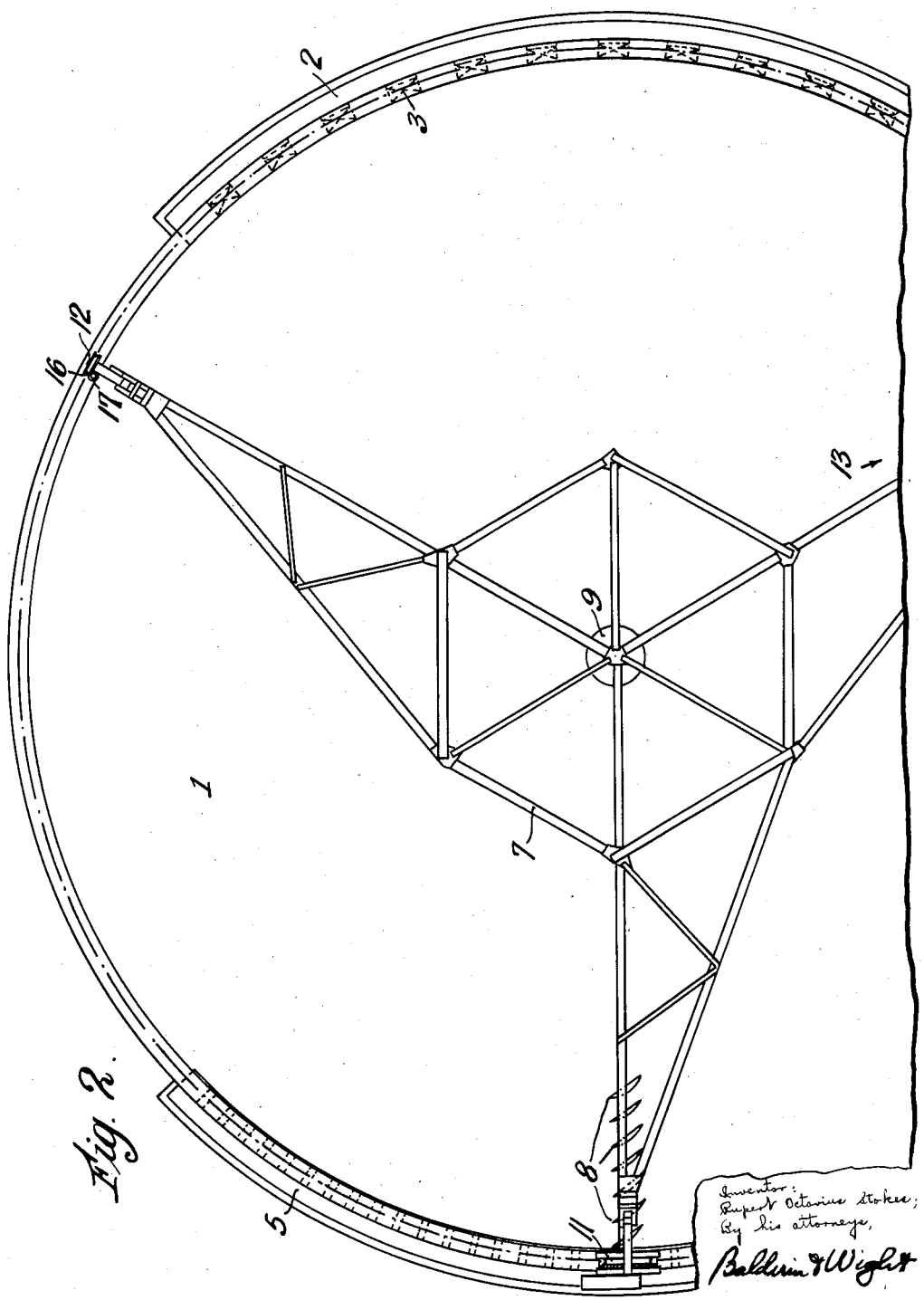
Figure 3:
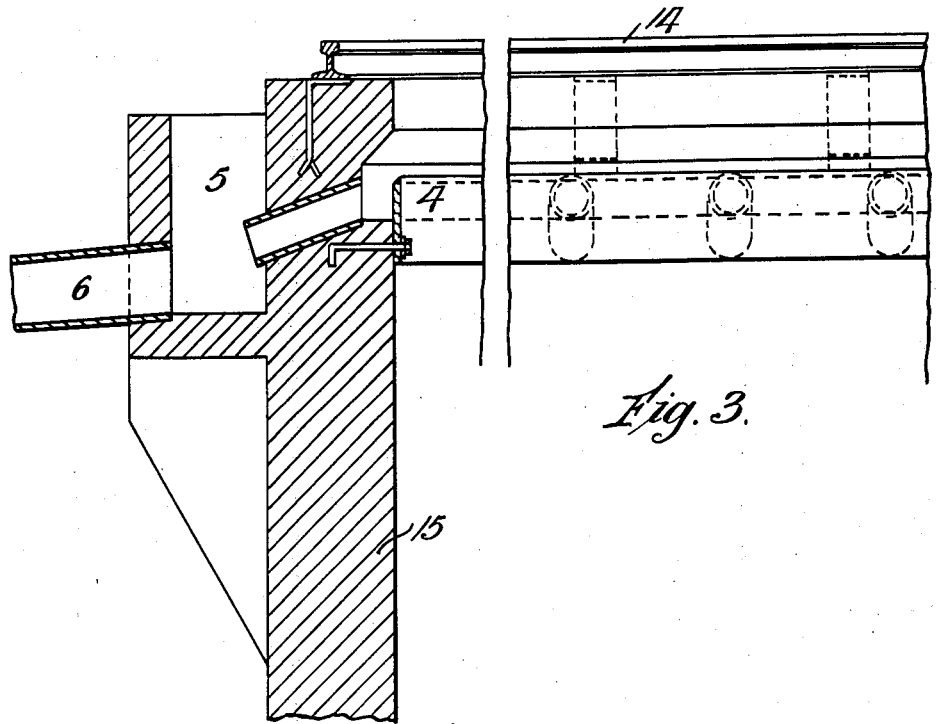
Figure 9:
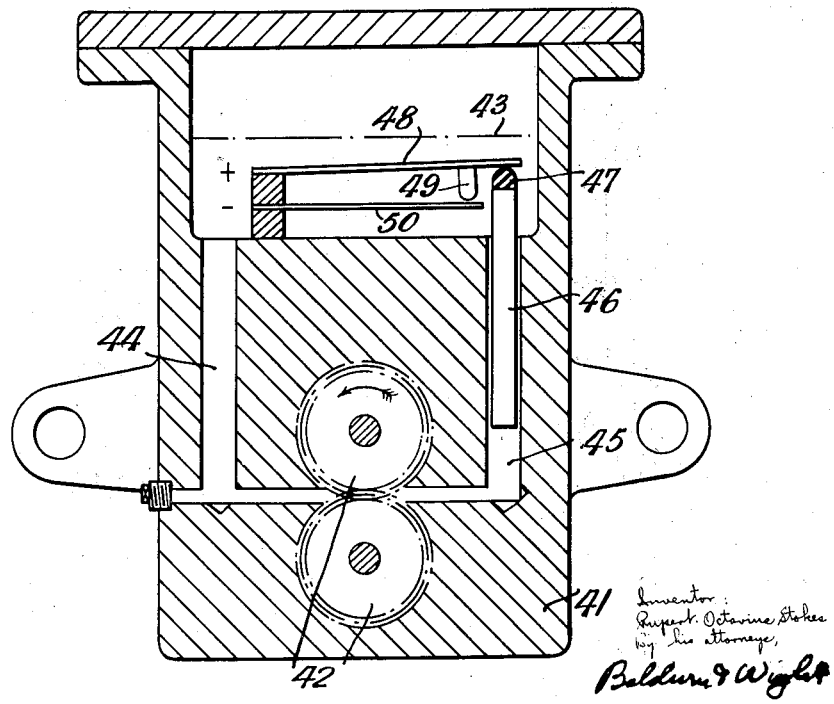

Therein, Figure 1 is a sectional elevation of a clarifier; Figure 2 is a part plan of the same; Figures 3 and 4 are sectional elevations to a larger scale of the discharge and inlet side respectively; Figure 5 is a sectional plan of the driving carriage; Figure 6 is an elevation of a trailing carriage; Figure 7 is a part sectional elevation of a clarifier showing a modified construction; Figure 8 is a sectional elevation of an underspeed alarm device, and Figure 9 is a sectional elevation of an alternative form of such device.

Referring to Figures 1 to 6, a circular tank 1 with inverted conical base is fitted along an arc of the periphery with a feed launder 2 from which the liquid to be clarified is discharged into the tank by means of a plurality of openings 3. Discharge takes place over weir boards 4 located on an opposite arc of the tank periphery into an overflow launder 5 from which the clarified liquid is discharged by the pipe 6 to be collected in any suitable manner.

The scraping arrangement comprises a framework 7 having three arms at an angle of about 120° to each other. The lower parts of the arms are near the conical base of the tank and are provided with oblique scraping blades 8 which tend to move the deposited solids towards a conical depression 9 at the centre of the base, from which they are discharged through an underflow pipe 10 by means of suitable pumping mechanism (not shown).

The ends of the arms are provided with carriages 11, 12, 13 running on a rail 14 which is supported on the top of the circular tank wall 15. Two of these carriages 12 and 13 are trailers serving merely as supports for the weight of the scraping arrangement. Each has a double flanged supporting wheel 16 and the carriage 12 is provided in addition with a guide wheel 17 engaging the inside edge of the rail 14. The carriage 11 may also have a guide wheel 17 if desired. The carriage 11 is a driving carriage provided with two double flanged wheels 18 each with a gear wheel 19 on its shaft meshing with a common pinion 20. The pinion 20 is driven by double reduction worm and spur gearing 21, 22 from an electric motor 23 mounted on the carriage. The electric supply to the motor is carried by means of leads 40ª in conduit 40 along the arm at the end of which the carriage 11 is mounted. These leads are connected at the other end to slip rings 24ª mounted at the top of a column or mast 24 at the centre of the scraping arrangement. The brushes 51ª running on the slip rings 24ª are connected by span wires 51 or by cable suspended on a messenger wire (not shown) to the starting gear suitably located outside the tank periphery.

Another form of clarifier is shown in Figure 7. In this drawing the tank 1, scraper frame 7, discharge cone 9, underflow pipe 10, carriages 11 and 12, rail 14 and tank wall 15 may be seen. These parts are similar to those already described except that the carriage 12 as well as the carriage 13, which does not appear in the view shown, has two flanged wheels.

In this form of clarifier the weir board 4 forming the edge of the discharge launder 5 extends all the way round the tank and the feed is taken to a well 25 at the centre. The feed supply to the well necessitates a launder 26 passing from the outside of the tank to the centre which is supported on a suitable girder structure 27. This provides accordingly a convenient support for the leads 51 which are taken as before to brushes 51ª and thence to slip rings 24ª mounted on the column or mast 24 at the centre and above the supporting point of the feed launder. The centre end of the feed launder truss is supported on a ball thrust washer 28 mounted on the centre column 24.

It may be found advisable in certain cases to apply the drive to more than one of the carriages. Moreover, the number of carriages to be used is not necessarily limited to three; the number will depend upon the conditions to be fulfilled by the apparatus. The invention is not limited to circular tanks, but can also be used with square tanks as described in British specification No. 248,679. In such a case if the drive is only applied to one carriage it is probable that the small periodic variation in speed will not be found of any disadvantage. On the other hand, if all these carriages are to be driven, certain difficulties may be incurred, since the three carriages are at different phases of their periodic movement at any given time. With a direct current supply this difficulty may be readily overcome by connecting the armatures of all three motors in series and the fields in parallel and operating the combination of three motors as a single shunt or compound wound motor. Other methods may also be devised for operating the three motors to compensate for the non-uniformity of speed in this case.

To guard against a stoppage which might have serious consequences it is advisable to fit an underspeed alarm to some suitable part of the apparatus. This would draw attention to a possible failure which might be caused by a slipping of the driving wheels on wet or greasy rails or by excessive loads on the arms or any other untoward occurrence. The alarm would then give the attendant the opportunity of rectifying the difficulty before the consequences become serious.

A suitable form of alarm is shown in Figure 8 and comprises a star wheel 29 fitted to one of the trailing wheels 16 and co-operating with an arm 30 so as to raise the arm periodically and then allow it to fall without obstruction.

The arm 30 is connected to a dashpot 31 near its pivot 32 which allows it to be raised quickly by means of a bye-pass 33 with non-return valve 34 and to fall slowly, the speed of fall being adjustable by a screw 35 controlling the small orifice 36 through the piston. Near the bottom of its travel the arm engages a push-button switch 37 or other suitable contact device closing the circuit to a bell or signal lamp or any other form of alarm.

At the correct speed of stirring arrangement 7 each point of the star wheel 29 will pick up the arm 30 during its fall from the previous point before it has had time to operate the alarm switch 37. If on the other hand the speed is too low or the stirring arrangement has stopped altogether, the arm 30 will actuate the alarm switch 37.

To guard against failure of the alarm if a stoppage should take place while the arm 30 is supported by a point of the wheel 29, the star wheel and arm are duplicated at 38, 39 and the second star wheel 38 has its point staggered in relation to the wheel 29, so that in every position one or other of the arms 30 and 39 is free to descend and actuate the alarm.

An alternative construction of alarm device is shown in Figure 9. In a casing 41 is mounted a gear pump 42 driven by suitable means from the wheel 16. The casing is filled with oil to the level 43 and the oil chamber is in communication with the gear pump by two L-shaped passages 44, 45, constituting the inlet and outlet respectively of the pump 42. In the outlet passage 45 there is a plunger 46 which permits a small amount of leakage. This leakage combined with that through the pump is sufficient to allow the plunger to sink if the pumps stops due to the stoppage of the wheel 16. The plunger 46 has an insulating tip 47 serving to raise a spring 48 when the plunger is raised. The spring 48 has on it a contact block 49 which makes contact with a spring 50 when a failure allows the plunger 46 to fall.

What I claim is:—

1. Apparatus for abstracting solid material from the liquid in which it is suspended, comprising in combination a tank to contain the suspension to be treated, a track round the edge of the tank, carriages running on said track, a device supported solely on said carriages to dip into the suspension, an electric motor driving at least one wheel of a carriage, a central mast on the moving device, slip rings on the said mast, leads from the slip rings to the motor and leads from the slip ring brushes to a point outside the tank.

2. Apparatus for abstracting solid material from the liquid in which it is suspended, comprising in combination a tank to contain the suspension to be treated, a track round the edge of the tank, carriages running on said track, a device supported solely on said carriages to dip into the suspension, an electric motor driving at least one wheel of a carriage, a central mast on the moving device, a feed launder supported at its discharge end on said mast, slip rings on the mast above the supporting point of the feed launder, leads from the slip rings to the motor and leads from the slip ring brushes to a point outside the tank.

3. Apparatus for abstracting solid material from the liquid in which it is suspended, comprising in combination a tank to contain the suspension to be treated, a track around the edge of the tank, three carriages running on said track, a three-armed device solely supported by its arms on the three carriages to dip into the suspension, an electric motor on one carriage driving at least one wheel thereof, a central mast on the three-armed device, slip rings on said mast, leads from the slip rings to the motor, and leads from the slip ring brushes to a point outside the tank.

RUPERT OCTAVIUS STOKES.